US006411335B1

United States Patent
Jang

(10) Patent No.: US 6,411,335 B1
(45) Date of Patent: Jun. 25, 2002

(54) IMAGE REPRODUCING APPARATUS AND METHOD FOR SETTING AND AUTOMATICALLY CHANGING AUDIO AND VISUAL SETTINGS FOR A PLURALITY OF CHANNELS

(75) Inventor: Geun-Sik Jang, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/192,266

(22) Filed: Nov. 16, 1998

(30) Foreign Application Priority Data

Nov. 14, 1997 (KR) ............................................. 97-60019

(51) Int. Cl.[7] ................................................. H04N 5/44
(52) U.S. Cl. .......................... 348/553; 348/731; 348/725
(58) Field of Search ................................. 348/553, 554, 348/555, 556, 557, 558, 571, 569, 570, 563, 686, 689, 731, 732, 733, 738, 725; H04N 5/44

(56) References Cited

U.S. PATENT DOCUMENTS 5,428,405 A * 6/1995 Lee .............................. 348/569
5,446,505 A * 8/1995 Soo et al. ..................... 348/563
5,617,151 A * 4/1997 Lee .............................. 348/726
5,781,247 A * 7/1998 Wehmeyer et al. .......... 345/810
6,263,502 B1 * 7/2001 Morrison et al. ............ 348/563

* cited by examiner

Primary Examiner—Michael H. Lee
(74) Attorney, Agent, or Firm—Sughrue Mion, PLLC

(57) ABSTRACT

An image reproducing apparatus and method are provide for setting and automatically changing audio and visual settings for a plurality of channels. The image reproducing apparatus which receives broadcasting signals of the plurality of channels comprises a command applying unit for setting user's audio and visual settings in accordance with a selected channel, a memory for storing data of initial audio and visual settings with respect to audio and video signals, and the user's audio and visual settings for each channel. A microprocessor controls the setting of data of the user's audio and visual settings for each channel set by the command applying unit to store the set data in the memory, and reads data of the user's audio and visual settings for a selected channel from the memory to output audio and video signals in accordance with the read data of the user's audio and visual settings.

4 Claims, 2 Drawing Sheets

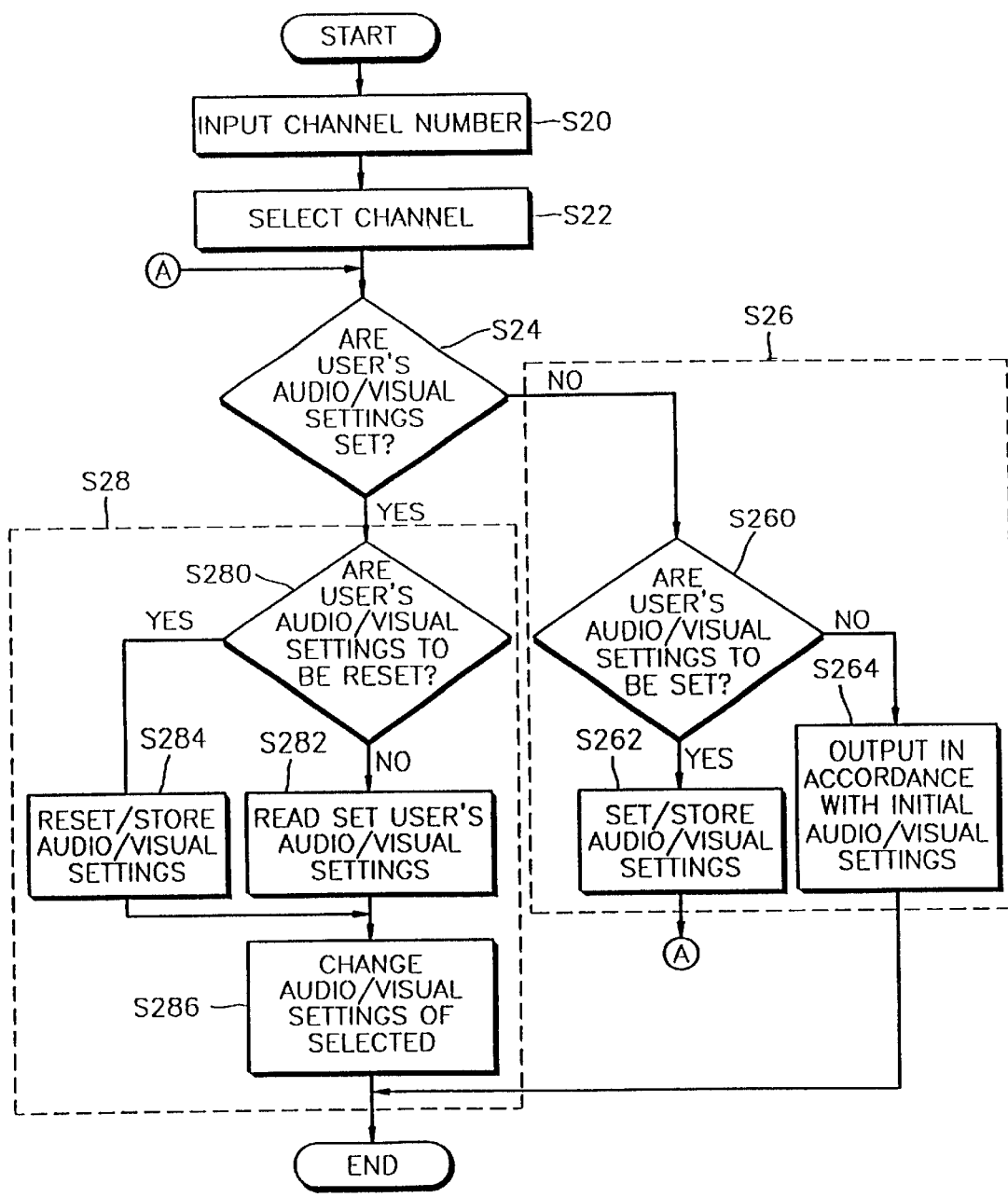

IMAGE REPRODUCING APPARATUS AND METHOD FOR SETTING AND AUTOMATICALLY CHANGING AUDIO AND VISUAL SETTINGS FOR A PLURALITY OF CHANNELS

BACKGROUND OF THE INVENTION

1. Field of the Invention

The present invention relates to an image reproducing apparatus, and more particularly, to an image reproducing apparatus for automatically changing audio/visual settings for each channel, and to methods for setting and changing the audio/visual settings for each channel in accordance with the same.

2. Description of the Related Art

In an image reproducing apparatus (e.g., a television set) capable of selecting a plurality of broadcast channels, if a channel is selected, video and audio data of the television are output according to data of initial audio/visual settings, or data of audio/visual settings which is set already before a current channel is selected.

However, audio and video signals output from the broadcasting stations, each having a different specification depending on a transmitting path are controlled in the television set according to the set audio/visual settings. Here, when a broadcast channel A is changed to a broadcast channel B, it is desirable that the audio/visual settings for channel A can be also changed to those for channel B. Thus, a user must change the audio/visual settings for each channel whenever the broadcast channels are changed.

SUMMARY OF THE INVENTION

To solve the above problems, it is an objective of the present invention to provide an image reproducing apparatus for automatically changing audio/visual settings for a plurality of channels, in which data of a user's audio/visual settings for channel is set and stored, and audio and video data are automatically changed in accordance with the stored audio/visual settings when a channel is changed.

It is another objective of the present invention to provide a method for setting and changing audio/visual settings for a plurality of channels, in which audio/visual settings for each channel are changed using the image reproducing apparatus.

Accordingly, to achieve the first objective, there is provided an image reproducing apparatus for automatically changing audio/visual settings for a plurality of channels comprising a command applying unit for setting user's audio/visual settings in accordance with a selected channel; a memory for storing data of initial audio/visual settings with respect to audio and video signals, and the user's audio/visual settings for each channel; and a microprocessor for controlling the setting of data of the user's audio/visual settings for each channel set by the command applying unit to store the set data in the memory, and reading data of the user's audio/visual settings for a selected channel from the memory to output audio and video signals in accordance with the read data of the user's audio/visual settings.

To achieve the second objective, there is provided a method for setting and changing a user's audio/visual settings for a plurality of channels, in an image reproducing apparatus, comprising the steps of (a) determining whether the user's audio/visual settings for a selected channel are preset; (b) setting the user's audio/visual settings for the selected channel, if the user's audio/visual settings for the selected channel are not preset in step (a); and (c) changing data of the user's audio/visual settings for the selected channel to reset data of audio/visual settings, if the user's audio/visual settings for the selected channel are preset in step (a) and required to be reset.

BRIEF DESCRIPTION OF THE DRAWINGS

The above objectives and advantages of the present invention will become more apparent by describing in detail a preferred embodiment thereof with reference to the attached drawings in which:

FIG. 2 is a flowchart illustrating a method of setting and changing audio/visual settings for each channel, according to the present invention.

DESCRIPTION OF THE PREFERRED EMBODIMENTS

Figure 1:
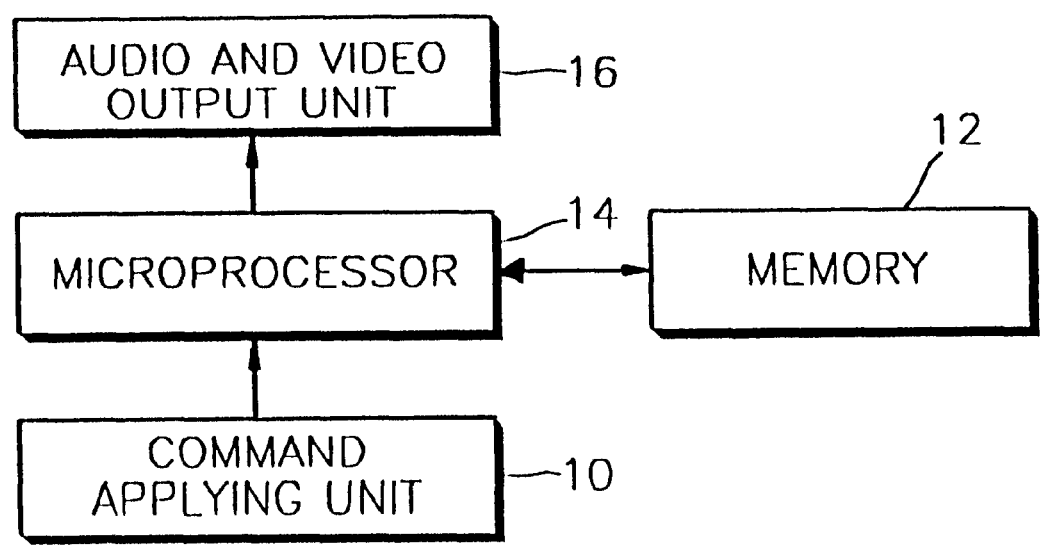
FIG. 1 is a block diagram of the structure of an image reproducing apparatus which automatically changes audio/visual settings for a channel, according to the present invention.

Referring to FIG. 1, an image reproducing apparatus comprises a command applying unit 10, a memory 12, a microprocessor 14 and an audio and video output unit 16.

The command applying unit 10 receives a desired broadcast channel number, and sets the user's audio/visual settings. The audio/visual settings of the television have initial settings and a user's settings, and each setting includes an audio component and a video component. The initial audio/visual settings are base data which is set when a television is manufactured. At this time, a volume level is set to 0. The video settings include items of brightness, color and contrast, and the audio settings include items of volume level, sound balance, mono and stereo. The user's audio/visual settings are data of the audio and video characteristics set by the user for each channel.

Data may be read from and written to the memory 12. In particular, the memory 12 is for storing data of the initial audio/visual settings and user's audio/visual settings for each channel with respect to audio and video signals. Further, in order to reset the data of the user's audio/visual settings for each channel, new data of the user's audio/visual settings is written over the data of the previously set user's audio/visual settings.

The microprocessor 14 controls a tuner (not shown) to select a channel in accordance with a channel number output from the command applying unit 10, controls the user's audio/visual setting data to be stored in the memory 12 when the user's audio/visual settings are set for the selected channel, and controls the audio and video output unit 16 to read the data of the stored user's audio/visual settings for each channel and output audio and video data in accordance with the read data of the user's audio/visual settings.

Referring to FIG. 2, a method of setting and changing audio/visual settings for each channel according to the present invention includes the steps of inputting a desired channel number (S20), selecting the input channel by a tuner (S22), determining whether the user's audio/visual settings for the selected channel are set, according to the microprocessor (S24), setting the user's audio/visual settings if the user's audio/visual settings are not set in step S24 (S26), and changing the audio/visual settings for the selected channel, to new audio/visual settings if the user's audio/visual settings are to be reset, and otherwise the present audio/visual settings is maintained (S28).

In step S26 of setting the user's audio/visual settings, it is determined whether the user's audio/visual settings are to be set (S260). If the audio/visual settings for the currently-selected channel are required to be set, the audio and video settings are set to those appropriate for the currently selected channel by the user, and then the set audio and video settings are stored (S262). However, if audio/visual settings for the currently selected channel are not required to be set, the audio and video data are output according to the initial audio/visual settings or audio/visual settings previously set for the selected channel (S264).

Step S28 for changing the user's audio/visual settings for each channel will be described in detail as follows. First, it is determined whether the preset user's audio/visual settings are to be reset (S280). If the resetting of the audio/visual settings is not required in step S280, the data of the user's audio/visual settings corresponding to the selected channel is read from the memory (S282), and the audio/visual settings are changed according to the read data (S286). However, in order to change the preset audio/visual settings in S280, the user's audio/visual settings are reset and the reset data is stored in the memory (S284). At this time, the data of the preset user's audio/visual settings is overwritten with the data of the reset user's audio/visual settings.

The operation of the apparatus of FIG. 1 will now be described with reference to the flowchart of FIG. 2.

If a predetermined channel number is input through a command applying unit 10 (S20), the microprocessor 14 controls the tuner(not shown) to select a broadcasting channel in accordance with the input channel number (S22), and it is determined whether the user's audio/visual settings for the selected channel are set (S24).

If the user's audio/visual settings are not set, it is checked whether the user's audio/visual settings for the selected channel are to be set (S260). At this time, a message for asking whether the user wants to set user's settings for the selected channel is provided on an on-screen-display screen. When the user wants to set the audio/visual settings, information for setting audio/visual parameters is provided on a screen.

The audio/visual settings set by the user are stored in the memory(12), using the information provided on the screen (S262). However, if the setting of the audio/visual settings is not required, the audio and video signals are output in accordance with the initial audio/visual settings (S264).

If the user's audio/visual settings are preset, it is checked whether the user's audio/visual settings are to be reset or not (S280). If the resetting is not required, the data of the audio and video settings is read from the memory 12 in accordance with the selected channel (S280). The audio and video signals are adjusted in accordance with the read user's audio/visual settings, and the adjusted signals are output (S282). However, if the user's audio/visual settings are required to be reset, the user's audio/visual settings are reset, and the data of the reset user's audio/visual settings is stored in the memory(12)(S284). Then, the audio/visual settings for a corresponding channel are changed (S286).

According to the present invention, the audio/visual settings for each channel are set and the set audio/visual settings are stored in the memory, so that when the channel is changed, there is no need to additionally adjust the audio/visual settings.

What is claimed is:

1. An image reproducing apparatus which can select a plurality of channels and automatically change audio and visual settings for each channel, comprising:

a command applying unit for determining a user's audio and visual settings in accordance with a selected channel;

a memory for storing data corresponding to initial audio and visual settings with respect to audio and video signals, and the user's audio and visual settings for each channel; and a microprocessor for controlling the setting of data of the user's audio and visual settings for each channel set by the command applying unit to store the set data in the memory, and reading data of the user's audio and visual settings for a selected channel from the memory to output audio and video signals in accordance with the read data of the user's audio and visual settings.

2. A method for setting and changing a user's audio and visual settings for a plurality of channels in an image reproducing apparatus capable of selecting the plurality of channels, comprising the steps of:

(a) determining whether the user's audio and visual settings for a selected channel have been preset;

(b) setting the user's audio and visual settings for the selected channel, if it is determined that the user's audio and visual settings for the selected channel have not been preset; and (c) changing data of the user's audio and visual settings for the selected channel to reset data of audio and visual settings, if it is determined that the user's audio and visual settings for the selected channel have been preset and are required to be reset.

3. The method of claim 2, wherein the step (b) comprises the substeps of:

(b1) determining whether the user's audio and visual settings for the selected channel are required to be set;

(b2) setting and storing the user's audio and visual settings for the selected channel, if it is determined that the user's audio and visual settings are required to be set in step (b1); and (b3) outputting audio and video data in accordance with initial audio and visual settings, if it is determined that the user's audio and visual settings are not required to be set in step (b1).

4. The method of claim 2, wherein the step (c) comprises the substeps of:

(c1) determining whether the user's audio and visual settings are required to be reset;

(c2) resetting data of the user's audio and visual settings and storing the reset data, if the user's audio and visual settings are required to be reset in step (c1), and reading data of the preset user's audio and visual settings for the selected channel, if the user's audio and visual settings are not required to be reset in step (c1); and (c3) changing the audio and visual settings for the selected channel to the reset data of audio and visual settings.

\* \* \* \* \*